(12) United States Patent
Molloy

(10) Patent No.: US 7,804,901 B2
(45) Date of Patent: Sep. 28, 2010

(54) RESIDUAL CODING IN COMPLIANCE WITH A VIDEO STANDARD USING NON-STANDARDIZED VECTOR QUANTIZATION CODER

(75) Inventor: Stephen Molloy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1317 days.

(21) Appl. No.: 11/271,218

(22) Filed: Nov. 10, 2005

(65) Prior Publication Data

US 2006/0171461 A1     Aug. 3, 2006

Related U.S. Application Data

(60) Provisional application No. 60/642,023, filed on Jan. 6, 2005.

(51) Int. Cl.
    *H04N 11/02* (2006.01)
    *G06K 9/00* (2006.01)

(52) U.S. Cl. .................. 375/240.22; 375/254; 382/253

(58) Field of Classification Search ............ 375/240.22, 375/240.25, 240.03, 240.01, 240.11, 254, 375/245; 382/103, 107, 155, 168, 181, 191–195, 382/209, 219, 232–239, 251, 253, 254, 274, 382/275, 276, 305
See application file for complete search history.

(56) References Cited

U.S. PATENT DOCUMENTS

| 6,088,392 A | * | 7/2000 | Rosenberg | 375/240.03 |
| 6,091,777 A | * | 7/2000 | Guetz et al. | 375/240.11 |
| 7,181,072 B2 | * | 2/2007 | Wang et al. | 382/239 |
| 7,295,608 B2 | * | 11/2007 | Reynolds et al. | 375/240.01 |
| 7,295,614 B1 | * | 11/2007 | Shen et al. | 375/240.25 |

* cited by examiner

*Primary Examiner*—Seyed Azarian
(74) *Attorney, Agent, or Firm*—John G. Richkenbrode

(57) ABSTRACT

This disclosure describes residual coding techniques that use vector quantization coding, which relies on template matching. However, rather than transmit vector quantization codebook indexes (or codewords) that may have no meaning to standard compliant CODECs, the techniques described herein map the residual templates to pre-computed compressed residual blocks that are compliant with a video standard. The standard compliant compressed residual blocks can then be transmitted to another device, which complies with the standard. The techniques can exploit the advantages associated with vector quantization coding, such as the ability to perform more parallel processing, while still maintaining compliance with a video coding standard.

29 Claims, 6 Drawing Sheets

RESIDUAL CODING IN COMPLIANCE WITH A VIDEO STANDARD USING NON-STANDARDIZED VECTOR QUANTIZATION CODER

The present Application for Patent claims priority to Provisional Application No. 60/642,023 entitled "Standards-Based Residual Encoding Using A Non-Standardized Vector Quantization Encoder" filed Jan. 6, 2005, and assigned to the assignee hereof and hereby expressly incorporated by reference herein.

TECHNICAL FIELD

This disclosure relates to digital video processing and, more particularly, encoding techniques that create standard compliant compressed residual blocks.

BACKGROUND

Digital video capabilities can be provided in a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital video devices can provide significant improvements over conventional analog video systems in creating, modifying, transmitting, storing, recording and playing full motion video sequences.

A number of different video coding standards have been established for coding digital video sequences. The Moving Picture Experts Group (MPEG), for example, has developed a number of standards including MPEG-1, MPEG-2 and MPEG-4. Other standards include the International Telecommunication Union Telecommunications (ITU-T) H.263 standard, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. Furthermore, new standards continue to emerge and evolve, including the ITU-T H.264 standard and a number of proprietary standards.

Many video coding standards allow for improved transmission rates of video sequences by coding data in a compressed fashion. Compression reduces the overall amount of data that needs to be transmitted for effective transmission of video frames. Most video coding standards, for example, utilize graphics and video compression techniques designed to facilitate video and image transmission over a narrower bandwidth than could be achieved without the compression. The standards typically set forth coding techniques that are used to create a standard compliant compressed residual block, but also allow for other techniques to be used, as long as the output bit stream complies with the standard.

Many standards, such as the MPEG standards and the ITU-T H.263 and ITU-T H.264 standards support video coding techniques that utilize similarities between successive video frames, referred to as temporal or inter-frame correlation, to provide inter-frame compression. The inter-frame compression techniques exploit data redundancy across frames by converting pixel-based representations of video frames to motion representations. In addition, some video coding techniques may utilize similarities within frames, referred to as spatial or intra-frame correlation, to further compress the video frames.

In order to achieve video frame compression, a digital video device typically includes an encoder for compressing digital video sequences, and a decoder for decompressing the digital video sequences. In many cases, the encoder and decoder form an integrated "CODEC" that operates on blocks of pixels within frames that define the video sequence. As used in this disclosure, the term "CODEC" refers to an encoder, a decoder or an integrated encoder/decoder.

In the MPEG-4 standard, the CODEC divides a video frame to be transmitted into video blocks referred to as "macroblocks." The ITU-T H.264 standard supports 16 by 16 video blocks, 16 by 8 video blocks, 8 by 16 video blocks, 8 by 8 video blocks, 8 by 4 video blocks, 4 by 8 video blocks and 4 by 4 video blocks. Other standards may support differently sized video blocks. For each video block in the video frame, the CODEC searches similarly sized video blocks of one or more previously encoded video frames to identify a similar video block, referred to as the "prediction block." The process of comparing a current video block to video blocks of other frames is generally referred to as motion estimation. Once a "prediction block" is identified for a current video block during motion estimation, the CODEC can code the differences between the current video block and the prediction block.

This process of coding the differences between a current video block and the prediction block includes a process referred to as motion compensation. Motion compensation involves creating a "residual," which is a block of data indicative of the differences between the current video block to be coded and the prediction block. In particular, motion compensation usually refers to the act of fetching the prediction block using a motion vector, and then subtracting the prediction block from an input block to generate the residual. The residual typically includes substantially less data than the original video block that is represented by the difference block. "Intra" encoding also creates a "residual" but does so based on the differences between a video block to be encoded and a different video block of the same frame. The process of creating the residual in intra encoding is often referred to as "intra-prediction."

In either case, after the residual has been created, a series of additional steps can also be performed to further code the residual and further compress the data. These additional steps may depend on the coding standard being used, but are generally referred to as "residual coding." In MPEG-4 compliant CODECs, for example, the residual coding may include an 8×8 discrete cosine transform, followed by scalar quantization, followed by a raster-to-zigzag reordering, followed by run-length encoding, followed by Huffman encoding. The coded residual can be transmitted with a motion vector that indicates which video block from the previous frame (or subsequent frame) was used for the coding. A CODEC of a receive device receives the motion vector and the coded residual, and decodes the received information to reconstruct the video sequences.

The residual coding steps often become a bottleneck in video coding. This can be a problem for real time video, such as that used in video telephony (VT) applications. Moreover, limited computational resources and limited battery power can compound these issues for VT applications. Unfortunately, for most standards the residual coding steps are sequential processes that require the previous process to be performed before the subsequent process can be performed.

SUMMARY

This disclosure describes a residual coding techniques that use vector quantization coding, which relies on template matching. The techniques described herein map residual templates to pre-computed compressed residual blocks that are compliant with a video standard. For example, the residual templates may be mapped directly to the standard compliant compressed residual blocks, or alternatively, vector quantization codebook indexes that represent the residual templates may be mapped to the standard compliant compressed residual blocks. In either case, the standard compliant compressed residual blocks can then be transmitted to another device, which complies with the standard. The techniques can exploit the advantages associated with vector quantization coding, such as the ability to perform more parallel processing, while still maintaining compliance with a video coding standard.

The techniques described herein may include pre-computing a set of standard compliant compressed residual blocks for a set of residual templates. A coding device stores mappings between the residual templates and the set of standard compliant compressed residual blocks. The residual templates may be transformed or non-transformed templates. The stored mappings may be embodied in a "code book," which may also be efficiently defined by eliminating any redundant or similar residual templates. In order to perform residual coding, the coding device can utilize vector quantization coding that relies on template matching, and can access the code book to identify a standard compliant compressed residual block associated with a most closely matching residual template identified in the vector quantization coding. The standard compliant compressed residual block can then be transmitted, rather than transmitting a vector quantization codebook index that identifies the residual template, as would be done with conventional vector quantization encoding techniques.

In one embodiment, this disclosure provides a video coding device comprising a memory that stores information mapping residual templates to standard compliant compressed residual blocks, and a residual coder that compares a residual to the residual templates, identifies one of the residual templates that most closely matches the residual, and selects a corresponding one of the standard compliant compressed residual blocks.

In another embodiment, this disclosure provides a video coding method comprising storing information mapping residual templates to standard compliant compressed residual blocks, comparing a residual to the residual templates to identify one of the residual templates that most closely matches the residual, and selecting a corresponding one of the standard compliant compressed residual blocks.

In another embodiment, this disclosure provides a computer readable medium comprising instructions that upon execution in a processor cause the processor to access stored information mapping residual templates to standard compliant compressed residual blocks, compare a residual to the residual templates to identify one of the residual templates that most closely matches the residual, and select a corresponding one of the standard compliant compressed residual blocks.

In another embodiment, this disclosure provides a computer readable medium comprising a data structure stored thereon for controlling a vector quantization encoding process in a video encoding device, wherein the data structure maps residual templates of the vector quantization encoding process to video encoding standard compliant compressed residual blocks.

In another embodiment, this disclosure provides a method comprising identifying a set of residual templates, performing a standard compliant coding process on the set of residual templates to generate a set of standard compliant compressed residual blocks, and storing information mapping the set of residual templates to the set of standard compliant compressed residual blocks.

These and other techniques described herein may be implemented in a video coding device in hardware, software, firmware, or any combination thereof. If implemented in software, the software may be executed in a processor, such as a programmable processor that supports instructions. As an example, the instructions may be single instruction multiple data (SIMD) instructions. In this case, the techniques may exploit the SIMD architecture and allow for parallel processing during the residual coding. The software that executes the techniques may be initially stored in a computer readable medium and loaded and executed in the processor in order to perform such residual coding.

Additional details of various embodiments are set forth in the accompanying drawings and the description below. Other features, objects and advantages will become apparent from the description and drawings, and from the claims.

DETAILED DESCRIPTION

Figure 1:
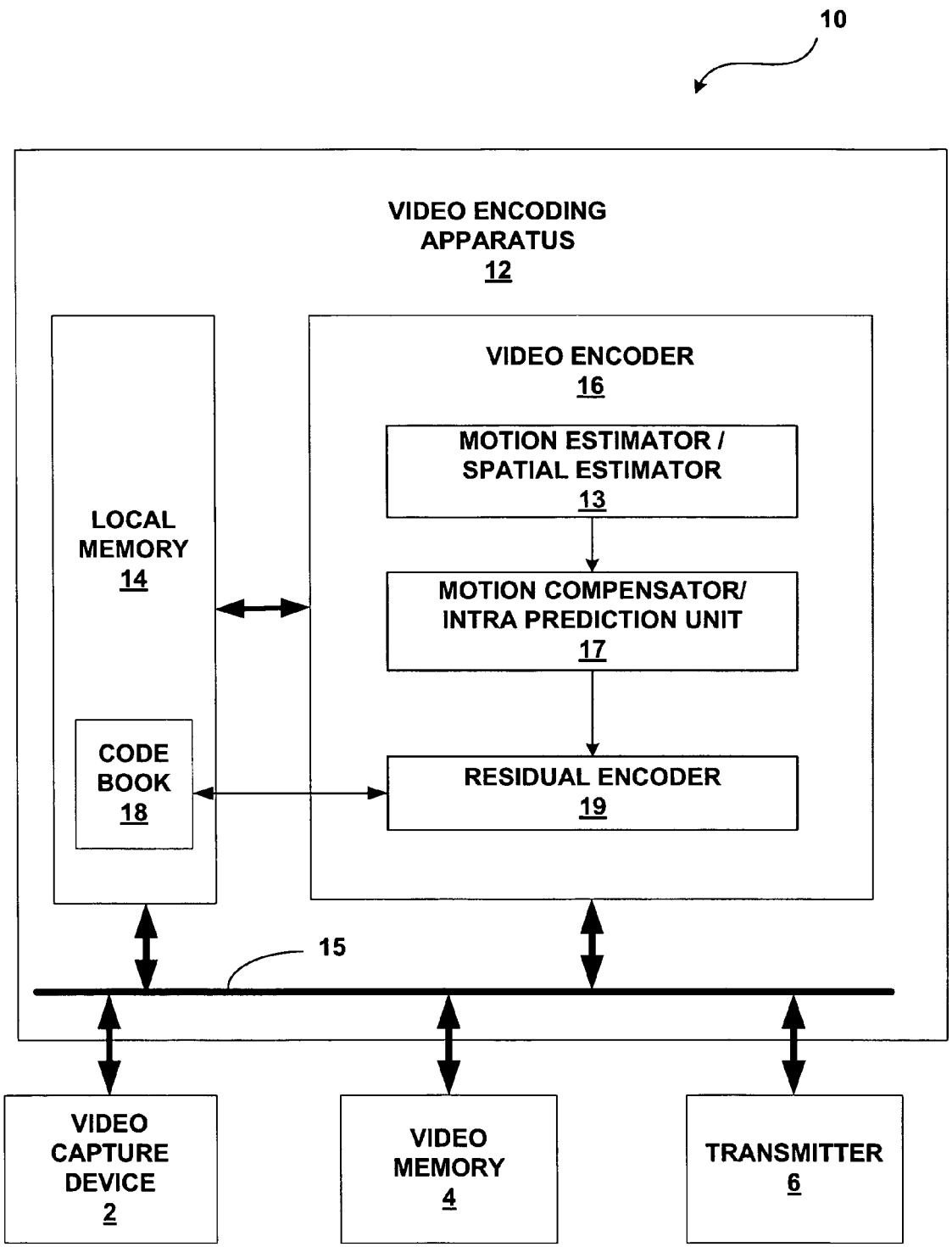
FIG. 1 is an exemplary block diagram of a video coding device that can implement one or more of the residual coding techniques described herein.

This disclosure describes residual coding techniques that use vector quantization coding, which relies on template matching in the residual coding process. Residual coding refers to the coding of a "residual" that results from motion estimation and motion compensation, or that results from spatial estimation and intra-prediction. Motion estimation and motion compensation are well known techniques that are used in many video coding standards to exploit temporal or inter-frame data correlation to provide for inter-frame compression. The process of comparing a current video block to be encoded to various other video blocks of another frame is generally referred to as motion estimation. This process of coding the differences between the current video block and the prediction block includes a process referred to as motion compensation. Motion compensation usually refers to the act of fetching the prediction block using a motion vector, and then subtracting the prediction block from an input block. The output of motion compensation is referred to as the "residual," and generally comprises a block of data indicative of the differences between the current video block to be coded and the prediction block identified by motion estimation. Spatial estimation and intra-prediction techniques also create a "residual" and generally refer to well known techniques that are used to exploit intra-frame data correlation.

After motion compensation (or intra-prediction) has created the residual, a series of additional steps can also be performed to further code the residual and further compress the data. The additional steps that are performed may depend on the coding standard being used, but are generally referred to as "residual coding." This disclosure contemplates residual encoding techniques according to vector quantization encoding techniques, which may improve and accelerate the encoding process and possibly allow parallel processing techniques to be used during the residual encoding.

In residual vector quantization coding, the residual is compared to residual templates. Conventionally, once a best matching residual template is identified, a vector quantization codebook index that identifies the best matching residual template is transmitted. The vector quantization codebook index is sometimes referred to as a codeword. In accordance with this disclosure, however, rather than transmit vector quantization codebook indexes that may have no meaning to standard compliant CODECs, the residual templates are mapped to pre-computed compressed residual blocks that are standard compliant. Then, the standard compliant compressed residual blocks can be transmitted. In this manner, the techniques described herein can exploit the advantages associated with vector quantization coding, such as the ability to perform parallel processing, while still maintaining compliance with a video coding standard. The techniques described herein may be applied with respect to transformed or non-transformed residual templates. In other words, one or more residual encoding steps may be applied prior to the templates matching techniques, but in either case, this disclosure allows the output to be standard compliant.

The techniques of this disclosure may include pre-computing a set of standard compliant compressed residual blocks for a set of residual templates. A coding device stores a mapping of the residual templates to the standard compliant compressed residual blocks. The mapping may comprise a code book and may possibly use vector quantization codebook indexes to represent the residual templates. In order to perform residual coding, the coding device can utilize vector quantization coding that relies on template matching, and can access the code book to identify a standard compliant compressed residual block associated with most closely matching residual template identified in the vector quantization coding.

FIG. 1 is a block diagram illustrating an exemplary video coding device 10. Video coding device 10 may form part of a digital video device capable of encoding and transmitting video data. The video data may be captured from a video camera or retrieved from a video archive. Examples of digital video devices that may incorporate coding device 10 include a digital television, a digital direct broadcast system, a wireless communication device, a personal digital assistant (PDA), a laptop computer, a desktop computer, a digital camera, a digital recording device, a cellular or satellite radio telephones, or any telecommunication device with video telephony (VT) capabilities. Device 10 may comply with a video encoding standard such as MPEG-4, ITU-T H.263, ITU-T H.264, or another video encoding standard that supports motion estimation and motion compensation techniques for inter-frame video encoding.

As shown in FIG. 1, device 10 includes a video encoding apparatus 12 to encode video sequences, and a video memory 4 to store the video sequences before and after encoding. Device 10 may also include a transmitter 6 to transmit the encoded sequences to another device, and possibly a video capture device 8, such as a video camera, to capture video sequences and store the captured sequences in memory 4. The various elements of device 10 may be communicatively coupled via a communication bus 15. Various other elements, such as intra-frame encoder elements, various filters, or other elements may also be included in device 10, but are not specifically illustrated for simplicity.

Video memory 4 typically comprises a relatively large memory space. Video memory 4, for example, may comprise dynamic random access memory (DRAM), or FLASH memory. In other examples, video memory 4 may comprise a non-volatile memory or any other data storage device.

Video encoding apparatus 12 may comprise a so called "chip set" for a mobile radiotelephone, including a combination of hardware, software, firmware, and/or processors or digital signal processors (DSPs). Video encoding apparatus 12 generally includes a video encoder 16 coupled to a local memory 14. Local memory 14 may comprise a smaller and faster memory space relative to video memory 4. By way of example, local memory 14 may comprise synchronous dynamic random access memory (SDRAM). Local memory 14 may comprise "on-chip" memory integrated with the other components of video encoding apparatus 12 to provide for very fast access to data during the processor-intensive encoding process. However, memories 4 and 14 may be combined into the same memory part. Video encoder 16 may support parallel processing techniques, which can be exploited during residual encoding as described herein.

During the encoding of a given video frame, the current video block to be encoded may be loaded from video memory 4 to local memory 14. A search space used in locating prediction video blocks may also be loaded from video memory 4 to local memory 14. The search space may comprise a subset of pixels of one or more of the preceding video frames (or subsequent frames). The chosen subset may be pre-identified as a likely location for identification of a prediction video block that closely matches the current video block to be encoded.

Local memory 14 is loaded with a current video block to be encoded and a search space, which comprises some or all of one or more video frames used in inter-frame encoding. Motion estimator/spatial estimator 13 compares the current video block to various video blocks in the search space in order to identify a prediction video block. Motion estimator/spatial estimator 13 generally represents a motion estimator that performs motion estimation for inter-frame encoding, a spatial estimator that performs spatial estimation for intra-frame encoding, or a combined unit that can perform either motion estimation and spatial estimation. In general, the prediction video block is a candidate video block found to provide an adequate match with the current video block for purposes of inter-frame correlation (or intra-frame correlation), which may be the most closely matching candidate video block. The prediction video block is one of many candidate video blocks evaluated during the motion estimation process to identify a video block having a minimum difference value relative to the current video block.

In order to perform the comparisons between the current video block to be encoded and the candidate video blocks in the search space of memory 14, motion estimator/spatial estimator 13 may perform sum of absolute difference (SAD) techniques, sum of squared difference (SSD) techniques, or other comparison techniques. In this manner, motion estimator/spatial estimator 13 can determine the difference values for the different candidate video blocks. A lower difference value generally indicates that a candidate video block is a better match, and thus a better candidate for use in motion estimation encoding than other candidate video blocks yielding higher difference values. A prediction video block may be identified once a suitable match is found.

Once a prediction video block is identified by motion estimator/spatial estimator 13 for a video block to be encoded, motion compensator/intra-prediction unit 17 creates a residual. Motion compensator/intra-prediction unit 17 generally represents a motion compensator that performs motion compensation for inter-frame encoding, an intra-prediction unit that performs spatial compensation for intra-frame encoding, or a combined unit that can perform either motion compensation and intra-prediction depending upon which mode is being used. Again, the residual comprises a block of data indicative of the differences between the current video block to be coded and the prediction video block used for the coding. In particular, motion compensator/intra-prediction unit 17 may fetch the prediction block using a motion vector, and then subtract the prediction block from an input block to generate the residual. The residual typically includes substantially less data than the original video block that is represented by the difference block.

After motion compensator/intra-prediction unit 17 has created the residual, residual coder 19 performs vector quantization encoding on the residual, as described herein. Residual coder 19 is generally a non-standardized vector quantization coder that performs a lookup to identify standard compliant compressed residual blocks. In this manner, residual coder 19 can identify standard compliant bits stream as part of the non-standardized vector quantization encoding of a residual. For example, residual coder 19 may invoke template matching techniques in which a set of residual templates are compared to the residual created by motion compensator/intra-prediction unit 17. The residual template that most closely matches the residual can then be used in the encoding process. Following the template matching process, residual encoder 19 accesses code book 18 in order to identify a standard compliant compressed residual block for the selected template. In some implementations, one or more transformations may be performed prior to the template matching, in which case, the templates used for the template matching may comprise transformed templates. In any case, the residual templates (transformed or non-transformed) can be mapped to standard compliant compressed residual blocks using code book 18.

In accordance with this disclosure, video encoding device 10 is pre-loaded with a code book 18, e.g., which may be loaded into local memory 14 (as shown) or possibly video memory 4. In many cases, for example, the entire code book may be very large and stored in video memory 4. In this case, code book 18 may be a cache for storage of a portion of a complete code book stored in video memory 18. For simplicity in the following description, however, it will be assumed that the full code book is stored as code book 18 in local memory 14. In any case, code book 18 maps a set of residual templates (or values identifying the templates) to a corresponding set of standard compliant compressed residual blocks. The standard compliant compressed residual blocks may be pre-calculated for the set of templates using video training sequence. Therefore, once one of the residual templates is identified by residual coder 19, code book 18 can be accessed to map the identified residual template to a standard compliant compressed residual blocks.

In order to create code book 18, standard compliant compressed residual blocks may be pre-computed for a set of residual templates. Code book 18 stores this mapping, either by directly mapping the residuals themselves to compressed residual blocks, or by using vector quantization codebook indexes to represent the residual templates. The pre-computation of code book 18 may include all of the residual encoding steps performed with respect to each of the residual templates in compliance with the standard being supported. For example, the pre-computation of code book 18 may include processes such as transformation (e.g., DCT transformation), zig-zag scanning, run length coding, variable length (Huffman) coding, or any other process used in a given coding standard. Since one or more of these processes are performed with respect to residual templates prior to the encoding of a residual, the run time encoding of the residual can be accelerated. Moreover, the vector quantization techniques, which use template matching, may invoke parallel processing techniques that would not be possible if the standard residual encoding processes were performed at run time on the residual.

Figure 2:
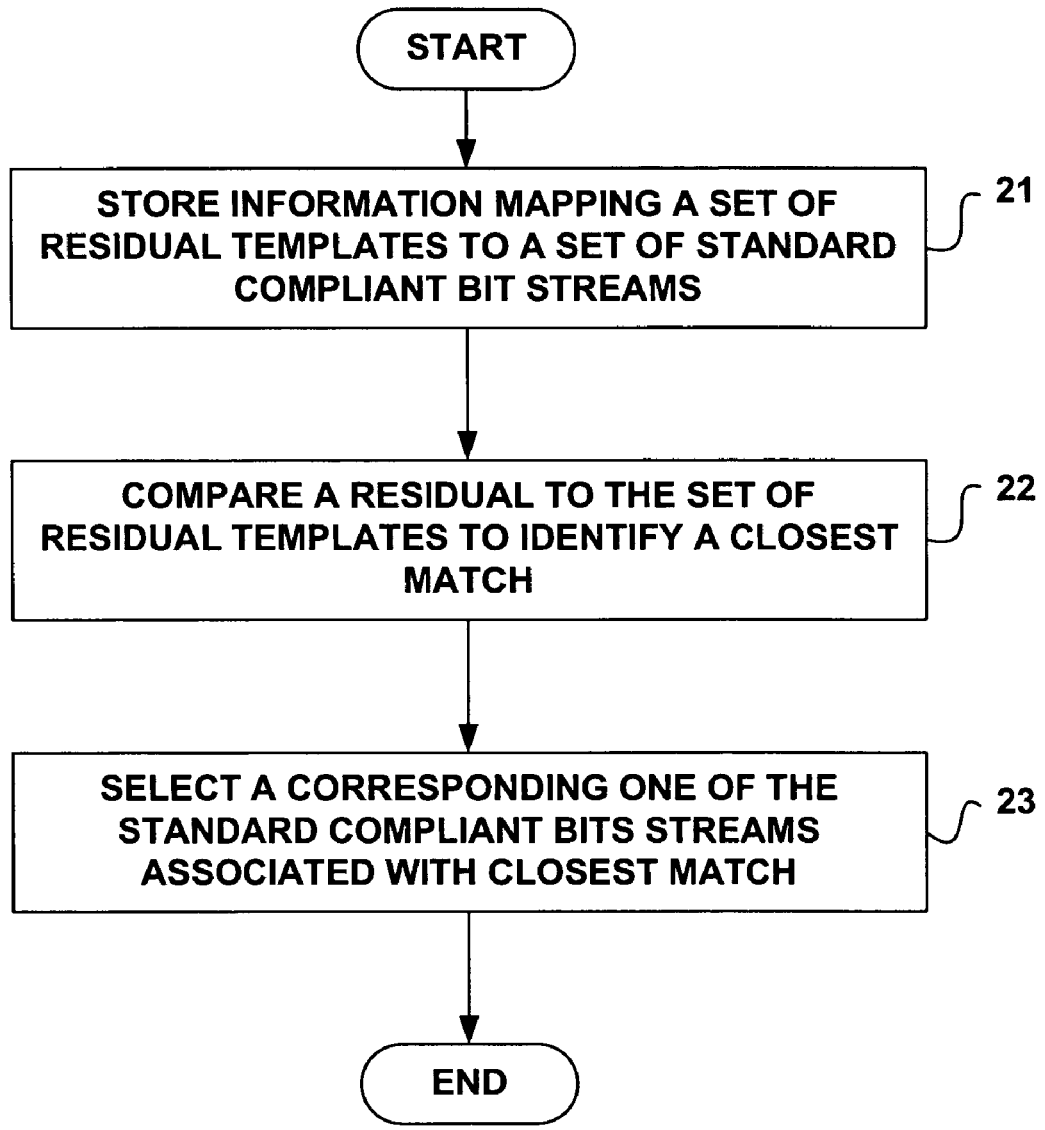
FIG. 2 is a flow diagram illustrating one embodiment of a residual coding technique according to this disclosure.

FIG. 2 is an exemplary flow diagram illustrating a residual encoding technique according to an embodiment of this disclosure. As shown in FIG. 2, memory 14 stores information mapping a set of residual templates to a set of standard compliant compressed residual blocks (21). For example, the information may comprise code book 18, and may include direct one-to-one mappings between the residual templates and corresponding compressed residual blocks, or may comprise vector quantization codebook indexes mapped to the corresponding compressed residual blocks, wherein the vector quantization codebook indexes are code words that identify the residual templates. The compressed residual blocks may be pre-computed to comply with a video coding standard, such as MPEG-2, MPEG-4, ITU-T H.263, ITU-T H.264, or another video coding standard that sets forth motion estimation, motion compensation and residual encoding.

For each residual output by motion compensator/intra-prediction unit 17, residual coder 19 compares the residual to a set of residual templates stored in memory 14 and identifies one of the residual templates that most closely matches the residual (22). For example, the template matching may use SSD or SAD techniques, or other comparison techniques to facilitate the comparisons of residual templates to the residual to be encoded. Again, in some cases, the residual templates may be transformed residual templates, e.g., for implementations in which transformations are performed prior to template matching. In any case, once the closest matching residual template is identified, residual encoder 19 accesses code book 18 to select a corresponding compressed residual block that was pre-computed for the identified residual template (23). In this manner, transmitter 6 can transmit standard compliant compressed residual blocks even though residual encoder 19 performs a vector quantization encoding process.

Again, the vector quantization techniques, which use template matching, may invoke parallel processing techniques that would not be possible if the standard residual encoding processes were performed at run time on the residual. For example, residual encoder 19 may comprise single instruction multiple data (SIMD) software instructions that execute on a processor that supports parallel processing. In this case, the template matching can be performed in parallel fashion. Residual encoder 19 may compare a given residual to the set of residual templates using parallel processing techniques, or may compare a plurality of residual associated with a plurality of coded video blocks to the set of residual templates using parallel processing techniques. In either case, the vector quantization encoding allows the parallel processing techniques to be used, which can accelerate the encoding, yet also result in standard compliant compressed residual block output as described herein.

Figure 3:
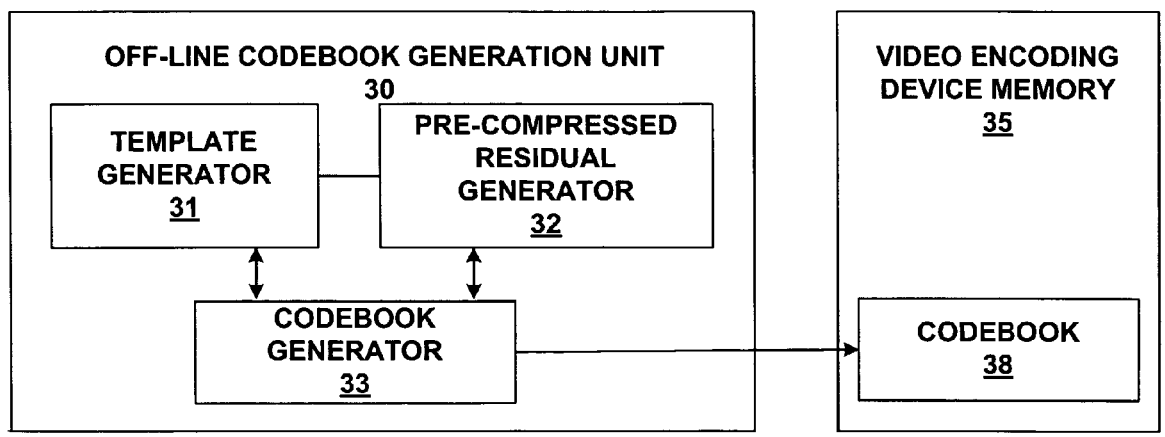
FIG. 3 is a block diagram illustrating an exemplary architecture for pre-computing a code book according to this disclosure.

FIG. 3 is a block diagram illustrating an exemplary architecture for pre-computing a code book according to this disclosure. As shown in FIG. 3, an off-line code book generation unit 30 pre-computes code book 38, which is loaded into video encoding device memory 35. Memory 35 may correspond to either local memory 14 or video memory 4 of device 10, or possibly a different type of memory used in a different video coding device. Code book 38 comprises a data structure, such as a lookup table (LUT) that maps a set of residual templates to a set of standard compliant compressed residual blocks. Code book 38 may store the residual templates, or may store vector quantization codebook indexes that represent the residual templates. In the later case, the residual templates may be stored in a different location for use in the template matching process.

Code book generation unit 30 includes a code book generator 33, a template generator 31 and a pre-compressed residual generator 32, although these components may be integrated. Generally, off-line code book generation unit 30 uses one or more video training sequences to create the entries of code book 38. In particular, code book generator 33 may execute a conventional code book generation algorithm, or any techniques for code book generation. Template generator 31 can generate a set of residual templates. In one example, template generator 31 generates a residual template by performing a discrete cosine (DCT) transform and a forward quantization on an input residual from the training sequence, and then performing inverse quantization and inverse DCT transform. More generally, template generator 31 performs quantization and/or transformation on a residual based on the encoding standard to be supported, and then performs inverse quantization and/or inverse transformation to create a residual template for the residual.

Pre-compressed residual generator 32 performs residual encoding steps on the quantized and transformed residuals. The actual residual encoding steps performed by pre-compressed residual generator 32 are determined by the standard to be supported. In one example, e.g., according to MPEG-4, pre-compressed residual generator 32 performs raster-to-zigzag reordering, followed by run-length encoding, followed by Huffman encoding. The output of pre-compressed residual generator 32 is a standard compliant compressed residual block for the residual. Thus, for a given residual of the training sequence, template generator 31 generates a residual template and pre-compressed residual generator 32 generates the corresponding compressed residual block in compliance with the video coding standard being supported. These outputs can then be mapped to one another in code book 38.

Code book generator 33 may also be designed to avoid the creation of duplicate templates or to remove any duplicate templates from the final code book 38 that is stored in video memory 35. Again, code book generator 33 may define the entries, and possibly remove entries, according to any known code book creation criteria. In some cases, code book generator 33 may apply error criteria and/or encoding quality factors in order to define the entries of code book 38. In this manner, the size of code book 38 may be significantly reduced, thereby reducing the necessary memory needed to store code book 38. In addition, code book 38 may also be defined to map transformed residual templates to standard compliant output, in which case, the encoding process would apply transformations prior to the template matching. Regardless of how the code book is created, it may be transmitted to video encoding device memory 35, which can be accessed at run-time to facilitate vector quantization residual encoding techniques with standard compliant compressed residual block output, as described herein.

Figure 4:
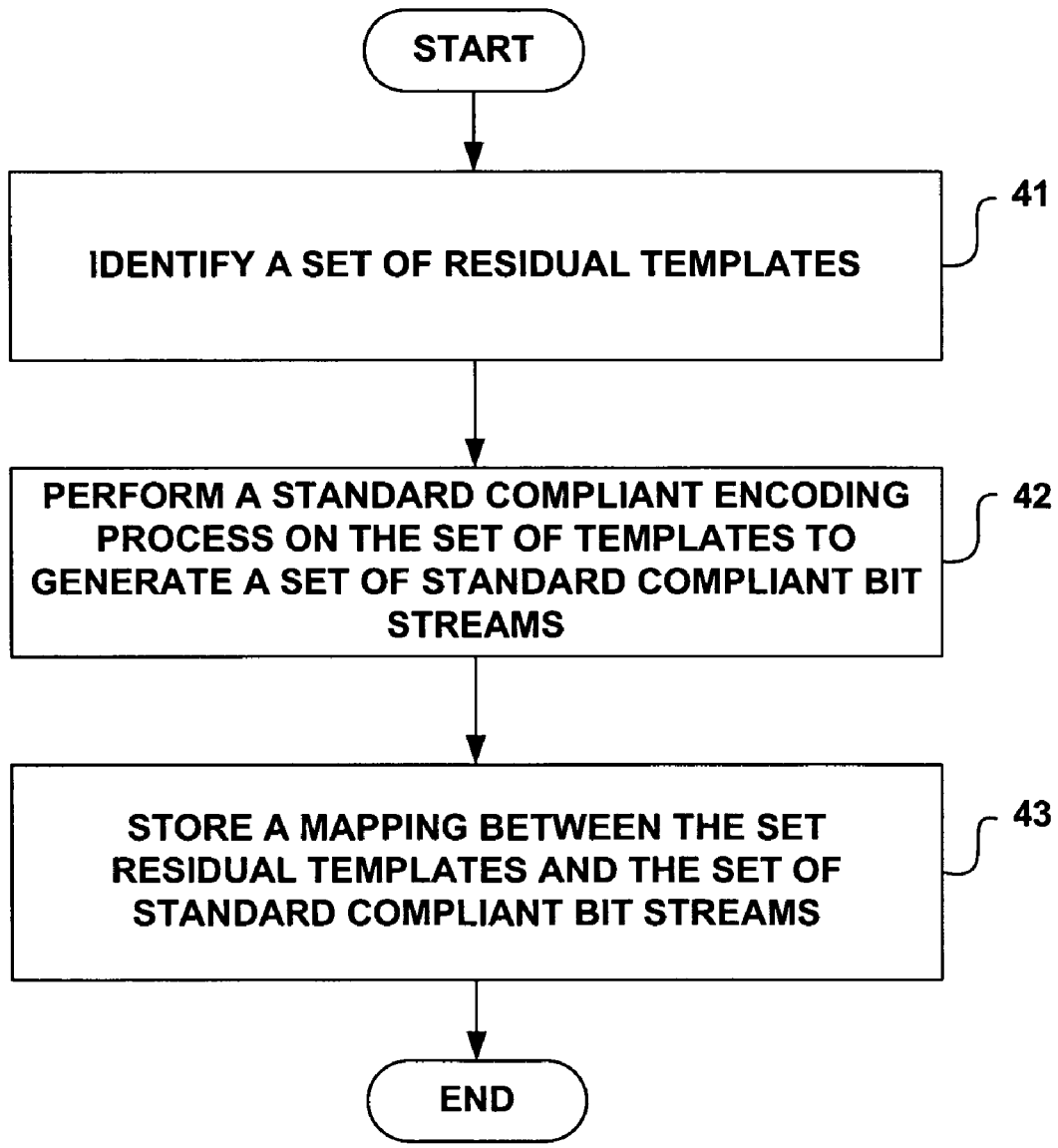
FIG. 4 is a flow diagram illustrating one exemplary technique for pre-computing a code book that can be exploited during residual coding.

FIG. 4 is a flow diagram illustrating one exemplary technique for pre-computing a code book that can be exploited during residual coding. As shown in FIG. 4, template generator 31 identifies a set of residual templates (41). Pre-compressed residual generator 32 performs a standard compliant encoding process on the templates to generate a set of standard compliant compressed residual blocks (42). Off-line code book generation unit 30 then stores a mapping between the set of residual templates and the set of standard compliant compressed residual blocks, e.g., as code book 38 in video encoding device memory 35 (43). In this manner, code book 38 can be pre-computed so that run time encoding can access code book 38 to identify standard compliant compressed residual blocks associated with selected templates.

Figure 5:
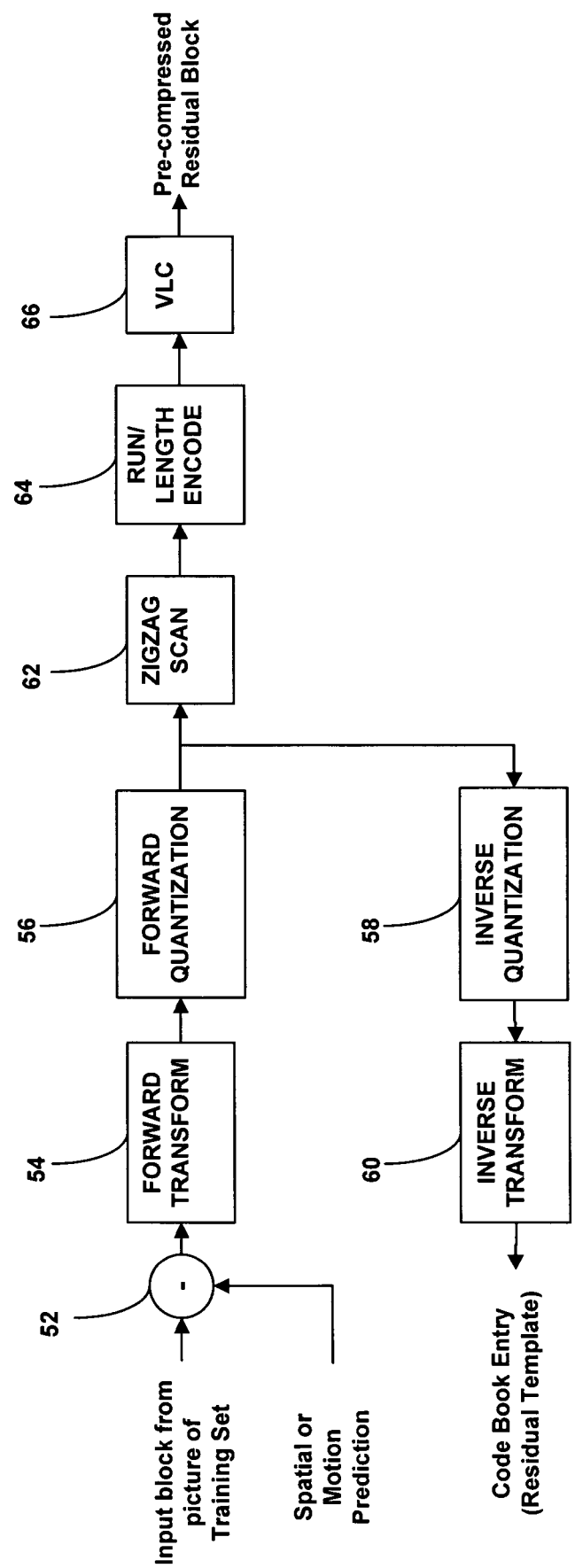
FIG. 5 is a block diagram illustrating an exemplary architecture for pre-computing residual templates and the corresponding standard compliant compressed residual blocks.

FIG. 5 is a more detailed block diagram illustrating an exemplary architecture 50 for pre-computing residual templates and the corresponding standard compliant compressed residual blocks. Architecture 50 may correspond to an integrated embodiment of template generator 31 and pre-compressed residual generator 32, and code book generator 33. As shown in FIG. 5, subtraction unit 52 receives input pictures from a training set. For each video block (e.g., each "macroblock") of the picture, subtraction unit 52 subtracts a spatial or motion prediction from the video block. In this sense, subtraction unit 52 represents a simplified depiction of a motion compensator or a simplified depiction of a intra-prediction unit. The output of subtraction unit 52 comprises a residual. Forward transform unit 54 performs a forward transformation on the residual, such as a forward DCT transform. Forward quantization unit 56 then quantizes the transformed residual by applying a selected quantization parameter (QP), which may be selected based on one or more encoding rate criteria.

Inverse quantization unit 58 performs inverse quantization on the output of unit 56 and inverse transform unit 60 performs inverse transformation, e.g., to reverse the DCT transformation. The output of inverse transform unit 60 comprises a code book entry in the form of a residual template. In this sense, the residual template should be very similar to the residual, but may be slightly different depending on the level of quantization applied in the forward and reverse quantization steps.

In order to map the residual template represented in "code book entry" output by inverse transform unit 60, forward transformed and forward quantized version of the residual (output by forward quantization unit 56) is also sent through zigzag scan unit 62, run/length encode unit 64 and variable length code (VLC) unit 66. Units 62, 64 and 66 generally represent sequential lossless residual encoding units defined by an encoding standard. Therefore, the output of VLC unit 66 is a standard compliant compressed residual block, e.g., which may comply with a standard such as MPEG-2, MPEG-4, ITU-T H.263, ITU-T H.264, or another standard. The label "pre-compressed residual block" represents the standard compliant compressed residual block. The "code book entry" output by inverse transform unit 58 can be mapped to the "pre-compressed residual block" output by VLC unit 66. This process can then be repeated for many pictures of a training set to create a data structure (i.e., a code book) that maps a set of residual templates to a set of standard compliant compressed residual blocks. Also, a number of code book generation techniques may be performed on the data structure to remove duplicate or similar templates to reduce memory needed to store the code book, and to reduce the number of template matching computations needed for the vector quantization encoding process.

Figure 6:
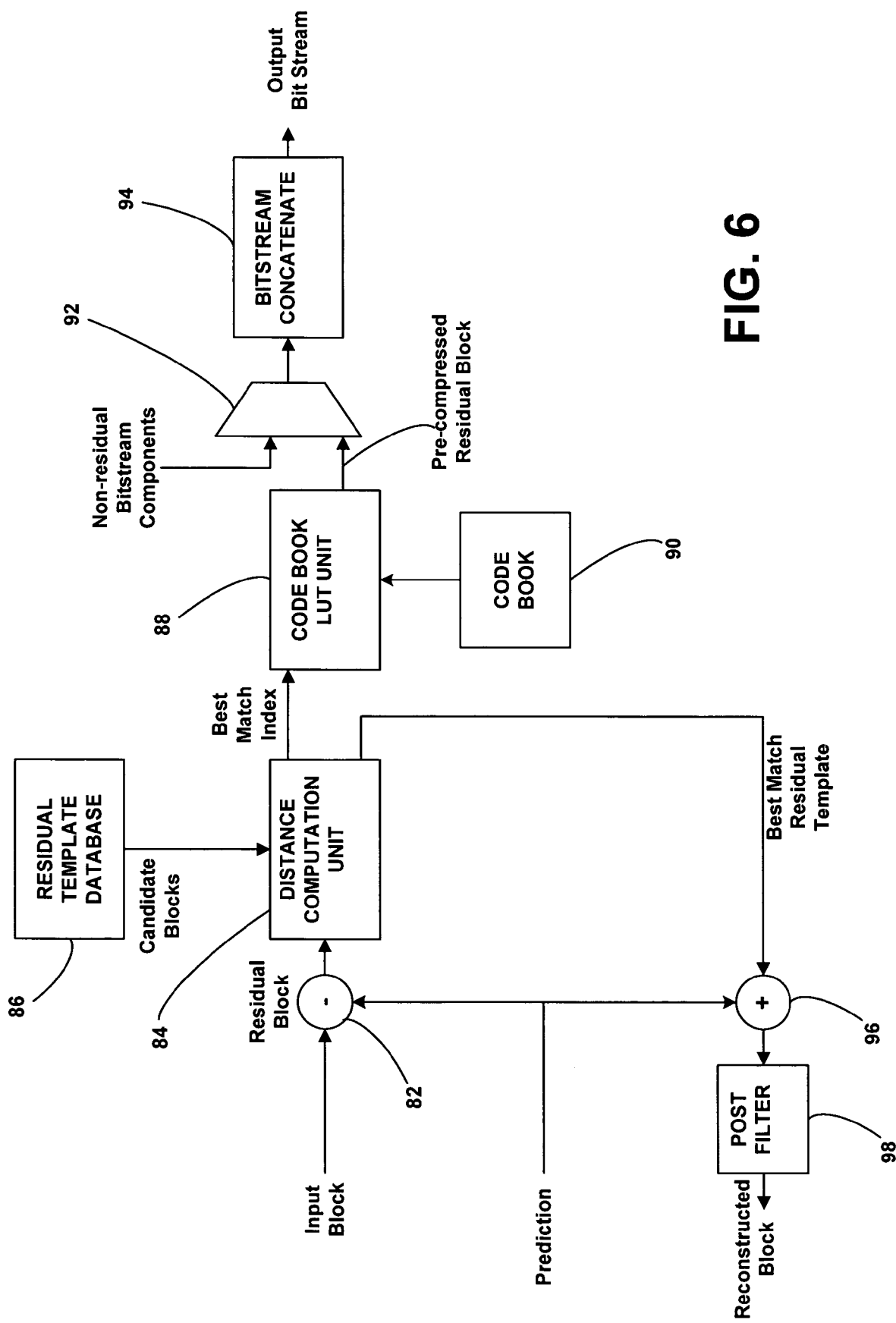
FIG. 6 is an exemplary block diagram illustrating one embodiment of a residual coder according to this disclosure.

FIG. 6 is an exemplary block diagram illustrating one embodiment of a residual coder according to this disclosure. Specifically, the architecture of FIG. 6 may substantially correspond to components of FIG. 1, including residual coder 19, code book 18 and a residual template database (not shown) stored in memory 14 of FIG. 1. The block diagram of FIG. 6 illustrates components that can be implemented at run time to facilitate vector quantization template matching techniques that output standard compliant compressed residual blocks.

As shown in FIG. 6, an input video block to be encoded is subtracted from a prediction block via subtraction unit 82 to generate a residual block. Distance computation unit 84 performs template matching to identify a residual template that most closely matches the residual. For example, distance computation unit 84 may access a residual template database 86, e.g., which may be stored in memory. Residual template database 86 is a complete database of all of the residual templates referenced in the code book. Distance computation unit 84 may perform comparisons, such as SSD or SAD techniques to compare the residual to the residual templates in order to identify the best match. The output of distance computation unit 84, "best match index" identifies the best match. In this sense, the "best match index" comprises a vector quantization codebook index or codeword, similar to those that are transmitted in conventional vector quantization encoding. However, unlike such conventional techniques, the architecture of FIG. 6 does not transmit the "best match index." Instead, the "best match index" is applied by code book lookup (LUT) unit 88.

Code book LUT unit 88 accesses code book 90, which stores a mapping of vector quantization codebook indexes (i.e., codewords for the residual templates) to pre-computed standard compliant compressed residual blocks. Thus, code book LUT unit 88 identifies a corresponding one of the standard compliant compressed residual blocks that maps to the "best match index." The selected standard compliant compressed residual block is labeled as a "pre-compressed residual block" in FIG. 6, and is forwarded to multiplexer 92. Multiplexer 92 combines the "pre-compressed d residual block" with non-residual bit stream components, such as the motion vector associated with the residual and various header values that may be defined by the standard being supported. A bit stream concatenate unit 94 may also be used to concatenate the pre-compressed video block with the non-residual bit stream components, e.g., in compliance with the standard being supported. The "output bit stream," which complies with the standard can then be transmitted to a different device that includes a CODEC that also complies with the standard The best match residual template identified by distance computation unit 84 can also be forwarded to an adder 96, which adds back the prediction video block to reconstruct the picture, e.g., for use in the motion estimation of the next picture. Post filter 98 may also be invoked, e.g., to perform one or more post filtering techniques, such as de-block filtering on the reconstructed picture. The reconstructed picture is a decoded version of the input picture following compression. The input picture and reconstructed picture may comprise sub-portions of a video frame, e.g., a video block such as a so called "macroblock."

A number of embodiments have been described. For example, residual coding techniques that use vector quantization template matching but result in standard compliant compressed residual blocks have been described. Although a few exemplary standards have been discussed, the techniques may be applied with respect to any video coding standard that includes a residual encoding process. The techniques have been primarily described in the context of template matching of non-transformed residuals. The described techniques, however, are equally applicable to transformed residuals, in which case, transformations would be performed in the encoding process prior to the template matching techniques described herein. The "residual" generally refers to a transformed or non-transformed residual block.

The techniques described herein may be implemented in hardware, software, firmware, or any combination thereof. If implemented in software, the techniques may be directed to a computer readable medium comprising program code, that when executed in a device that codes video sequences, performs one or more of the residual coding techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, one or more processors such as a DSP may execute instructions stored in memory in order to carry out one or more of the residual coding techniques. In some cases, the techniques may be executed by a DSP that invokes various hardware components to accelerate the coding process. In other cases, the CODECs described herein may be implemented as one or more microprocessor, one or more application specific integrated circuits (ASICs), one or more field programmable gate arrays (FPGAs), or some other equivalent integrated or discrete logic circuitry or hardware-software combination. These and other embodiments are within the scope of the following claims.

The invention claimed is:

1. A video coding device comprising:
   a memory that stores information mapping residual templates to standard compliant compressed residual blocks; and
   a residual coder that compares a residual to the residual templates, identifies one of the residual templates that most closely matches the residual, and selects a corresponding one of the standard compliant compressed residual blocks,
   wherein the information mapping the residual templates to the standard compliant compressed residual blocks comprises a set of vector quantization codebook indexes mapped to the standard compliant bits streams, wherein the vector quantization codebook indexes comprise codewords that represent the residuals.

2. The video coding device of claim 1, further comprising a motion estimator that performs motion estimation and a motion compensator that performs motion compensation to generate the residual.

3. The video coding device of claim 1, wherein the standard compliant compressed residual blocks comply with one of the following standards: MPEG-2, MPEG-4, ITU-T H.263 and ITU-T H.264.

4. The video coding device of claim 1, wherein the information comprises a code book that is pre-computed by performing a standard compliant coding process on the residual templates.

5. The video coding device of claim 1, wherein the residual coder compares the residual to the residual templates using parallel processing techniques.

6. The video coding device of claim 1, wherein the residual coder compares a plurality of residuals associated with a plurality of coded video blocks to the residual templates and selects a corresponding plurality of standard compliant bits streams.

7. The video coding device of claim 6, wherein the residual coder compares the plurality of residuals to the residual templates using parallel processing techniques.

8. The video coding device of claim 1, wherein the residual coder comprises a processor that supports single instruction multiple data (SIMD) instructions, wherein the memory stores SIMD instructions to cause the processor to compare the residual to the residual templates, identify one of the residual templates that most closely matches the residual, and select a corresponding one of the standard compliant bits streams.

9. A video coding method comprising:
  storing information mapping residual templates to standard compliant compressed residual blocks;
  comparing a residual to the residual templates to identify one of the residual templates that most closely matches the residual; and
  selecting a corresponding one of the standard compliant compressed residual blocks,
  wherein the information mapping the residual templates to the standard compliant compressed residual blocks comprises vector quantization codebook indexes mapped to the standard compliant bits streams, wherein the vector quantization codebook indexes comprise codewords that represent the residuals.

10. The video coding method of claim 9, further comprising generating the residual via motion estimation and motion compensation.

11. The video coding method of claim 9, wherein the standard compliant compressed residual blocks comply with one of the following standards: MPEG-2, MPEG-4, ITU-T H.263 and ITU-T H.264.

12. The video coding method of claim 9, wherein the information comprises a code book, the method further comprising pre-computing the code book by performing a standard compliant coding process on the residual templates.

13. The video coding method of claim 9, further comprising comparing the residual to the residual templates using parallel processing techniques.

14. The video coding method of claim 9, further comprising comparing a plurality of residuals associated with a plurality of coded video blocks to the residual templates and selecting a corresponding plurality of standard compliant bits streams.

15. The video coding method of claim 14, further comprising comparing the plurality of residuals to the residual templates using parallel processing techniques.

16. A computer readable medium comprising instructions that upon execution in a processor cause the processor to:
  access stored information mapping residual templates to standard compliant compressed residual blocks;
  compare a residual to the residual templates to identify one of the residual templates that most closely matches the residual; and
  select a corresponding one of the standard compliant bits streams,
  wherein the information mapping the residual templates to the standard compliant compressed residual blocks comprises vector quantization codebook indexes mapped to the standard compliant bits streams, wherein the vector quantization codebook indexes comprise codewords that represent the residuals.

17. The computer readable medium of claim 16, wherein the standard compliant compressed residual blocks comply with one of the following standards: MPEG-2, MPEG-4, ITU-T H.263 and ITU-T H.264.

18. The computer readable medium of claim 16, wherein the information comprises a code book that is pre-computed by performing a standard compliant coding process on the residual templates.

19. The computer readable medium of claim 16, wherein the instructions cause the processor to compare the residual to the residual templates using parallel processing techniques.

20. The computer readable medium of claim 16, wherein the instructions cause the processor to compare a plurality of residuals associated with a plurality of coded video blocks to the residual templates and select a corresponding plurality of standard compliant bits streams.

21. The computer readable medium of claim 20, wherein the instructions cause the processor to compare the plurality of residuals to the residual templates using parallel processing techniques.

22. The computer readable medium of claim 16, wherein the instructions comprise single instruction multiple data (SIMD) instructions.

23. A computer readable medium comprising a data structure stored thereon for controlling a vector quantization encoding process in a video encoding device, wherein the data structure maps residual templates of the vector quantization encoding process to video encoding standard compliant compressed residual blocks and wherein the data structure comprises vector quantization codebook indexes mapped to the standard compliant bits streams, wherein the vector quantization codebook indexes comprise codewords that represent the residuals.

24. The computer readable medium of claim 23, wherein the standard compliant compressed residual blocks comply with one of the following standards: MPEG-2, MPEG-4, ITU-T H.263 and ITU-T H.264.

25. The computer readable medium of claim 23, wherein the information comprises a code book that is pre-computed by performing a standard compliant coding process on the set of residual templates.

26. A method comprising:
  identifying a set of residual templates;
  performing a standard compliant coding process on the set of residual templates to generate a set of standard compliant compressed residual blocks; and
  storing information mapping the set of residual templates to the set of standard compliant compressed residual blocks,
  wherein the information comprises a set of vector quantization codebook indexes mapped to the set of standard compliant bits streams, wherein the set of vector quantization codebook indexes comprise codewords that represent the set of residuals.

27. The method of claim 26, wherein the standard compliant compressed residual blocks comply with one of the following standards: MPEG-2, MPEG-4, ITU-T H.263 and ITU-T H.264.

28. The method of claim 26, wherein the information mapping the set of residual templates to the set of standard compliant compressed residual blocks comprises a code book.

29. The method of claim 26, further comprising performing a residual coding process in the video encoding device by:
  comparing a residual to at least some of the set of residual templates to identify one of the residual templates that most closely matches the residual; and
  selecting a corresponding one of the standard compliant bits streams from the code book.

* * * * *